(12) United States Patent
Holt et al.

(10) Patent No.: US 8,679,047 B2
(45) Date of Patent: Mar. 25, 2014

(54) IMPACT RESISTANT, TORSION-REDUCING PROTECTIVE ATHLETIC GEAR USING SHEAR THICKENING FLUID

(75) Inventors: Shawn Edan Holt, Chesterfield, VA (US); Michael Paul Perez, Chesterfield, VA (US)

(73) Assignee: Presidium Athletics LLC, Chesterfield, VA (US)

(*) Notice: Subject to any disclaimer, the term of this patent is extended or adjusted under 35 U.S.C. 154(b) by 378 days.

(21) Appl. No.: 13/112,413

(22) Filed: May 20, 2011

(65) Prior Publication Data

US 2011/0283433 A1 Nov. 24, 2011

Related U.S. Application Data

(60) Provisional application No. 61/347,198, filed on May 21, 2010.

(51) Int. Cl.
*A61F 13/06* (2006.01)

(52) U.S. Cl.
USPC .............................................. 602/60; 602/75

(58) Field of Classification Search
USPC ..................... 602/60, 75; 2/181; 428/523
See application file for complete search history.

(56) References Cited

U.S. PATENT DOCUMENTS

| | | | |
|---|---|---|---|
| 1,213,118 A | 10/1917 | Lynch | |
| 3,649,426 A | 3/1972 | Gates, Jr. | |
| 4,252,910 A | 2/1981 | Schaefer | |
| 4,371,636 A | 2/1983 | Distler et al. | |
| 4,750,482 A * | 6/1988 | Sieverding | 604/317 |
| 4,951,317 A | 8/1990 | Gray et al. | |
| 5,037,880 A | 8/1991 | Schmidt et al. | |
| 5,599,290 A | 2/1997 | Hayes et al. | |
| 5,712,011 A | 1/1998 | McMahon et al. | |
| 5,776,839 A | 7/1998 | Dischler et al. | |
| 5,854,143 A | 12/1998 | Schuster et al. | |
| 6,211,099 B1 | 4/2001 | Hutto, Jr. et al. | |
| 6,485,446 B1 | 11/2002 | Brother et al. | |
| 6,701,529 B1 | 3/2004 | Rhoades et al. | |
| 7,100,216 B2 | 9/2006 | Matechen et al. | |
| 7,226,878 B2 | 6/2007 | Wagner et al. | |
| 7,381,460 B2 | 6/2008 | Palmer et al. | |
| 7,498,276 B2 | 3/2009 | Wagner et al. | |
| 7,556,857 B2 | 7/2009 | Sauer et al. | |
| 2005/0106310 A1 | 5/2005 | Green et al. | |
| 2005/0227559 A1 | 10/2005 | Temon et al. | |
| 2005/0282007 A1 | 12/2005 | Sauer et al. | |
| 2006/0234572 A1 | 10/2006 | Wagner et al. | |
| 2007/0029690 A1 | 2/2007 | Green et al. | |
| 2007/0149079 A1 * | 6/2007 | Vito et al. | 442/181 |
| 2008/0296435 A1 | 12/2008 | Cohen | |
| 2009/0004413 A1 | 1/2009 | Wagner et al. | |
| 2009/0191989 A1 | 7/2009 | Lammer et al. | |
| 2009/0305589 A1 | 12/2009 | Budden et al. | |
| 2010/0086747 A1 | 4/2010 | Plant | |
| 2010/0221521 A1 | 9/2010 | Wagner et al. | |
| 2011/0014996 A1 | 1/2011 | Shepherd et al. | |
| 2011/0302700 A1 * | 12/2011 | Vito et al. | 2/412 |
| 2011/0314589 A1 * | 12/2011 | Vito et al. | 2/181 |

* cited by examiner

OTHER PUBLICATIONS

International Search Report; International Application No. PCT/US2012/037244; dated Sep. 26, 2013; 7 pages.

*Primary Examiner* — Michael A. Brown
(74) *Attorney, Agent, or Firm* — Thomas & Karceski, P.C.

(57) ABSTRACT

An athletic tape or protective athletic sleeve is formed from an impregnated fabric substrate that is sealed on both sides. The impregnated fabric includes a shear thickening fluid that is made up of a suspension solution and solid particles. The shear thickening fluid is sealed within the fabric through use of sealing layers on both sides of the fabric.

18 Claims, 1 Drawing Sheet

IMPACT RESISTANT, TORSION-REDUCING PROTECTIVE ATHLETIC GEAR USING SHEAR THICKENING FLUID

RELATED APPLICATIONS

This application claims the benefit of U.S. provisional application Ser. No. 61/347,198, filed May 21, 2010, which is incorporated by reference in its entirety.

The field of the invention is a protective fabric for use as athletic gear. The fabric has a shear thickening fluid impregnated and sealed therein.

BACKGROUND OF THE INVENTION

There exists an extensive market for injury protection-related athletic gear, much of which currently employs foam-based padding for joints (elbow and knees) or common athletic tape for joint-related twisting. The Centers for Disease Control (CDC) provide data relative to the numerous recreational sports injuries (totally more than 10 million episodes each year with costs approaching $300 billion) in the form of non-lethal blunt-force trauma (i.e. being struck with balls, sticks, bats, clubs, other players, hard surfaces, or otherwise damage-inducing materials), causing bruises, abrasions, sprains, breaks, or other traumatic injuries. There are also inertial injuries that occur as a result of changes of direction imposed by the body not involving an impact (e.g., non-contact injury; twisting, torsion-based injury).

Sports-associated injuries, especially to the lower extremities, may cause immediate damage, ultimately limiting physical activity and causing long-term problems associated with mobility. Ankles and knees are very susceptible to contact and non-contact injuries as a result of the inherent unsteadiness within the joints themselves. While the human body is certainly capable of absorbing and dispersing blunt-force trauma, significant injuries are the consequence of considerable forces.

Shear thickening fluids, (STFs), also known as Non-Newtonian fluids and/or dilatants, are generally comprised of a suspension media (typically polymer-based) and inorganic colloidal particles of relatively uniform size. Normally, the STF is able to flow easily when force or high velocity is not applied. Under increased stress or strain at higher velocities or with elevated pressure, the STF rapidly stiffens or solidifies in response to the increased force as a result of higher viscosity and/or the alignment of the spherical particles within the suspension media. Importantly, this stiffening effect is a dynamic process with a rapid "on and off rate", making the material housing the STF both elastic and resilient.

SUMMARY

The present invention employs the combination of particle types that, when blended as part of a shear thickening fluid (STF), provides a reflexive dynamic force dispersion mechanism when applied to contour-fit sports products, including but not limited to, athletic tape, athletic socks, and joint-saving sleeves. The STF particle composition includes both smaller particle sizes (range: 10-280 nm) and larger particle sizes (300-800 nm), which will provide impact protection at lower (smaller range) and higher (larger range) forces. The materials to be used for STF applications can be, but are not limited to, cotton, polyester, nylon, rayon, Spandex, synthetic foams, or any fabrics where STF can fill the space within the structure of the fabric.

Materials intercalated with STFs will provide substantial protection of soft tissue due to their rate-dependent ability to resist external forceful impact and/or internal rapid joint stress or twisting. As joint strains occur as a result of increased torsion at a relatively weak connection point, especially with the knee and ankle, inclusion of STF-containing materials in athletic gear surrounding joints will eliminate many of the injuries associated with instability within the ankle, knee, wrist and elbow. Thus, because it is nearly impossible to predict and appropriately react to many of the forces and stresses that cause injury, it is clear that athletes (people in general) would benefit from athletic gear that is flexible during normal use but provides an immediate stiffening effect to prevent or reduce blunt-force traumas and/or joint-related torsional injuries.

The STF formulations can be applied either to a woven, knitted or non-woven fabric or to a non-woven yarn, followed by weaving or knitting, or may be applied to the spaces within foam-related materials. The application process involves coating the material/fabric with STF and the use of pressure/force to intercalate and impregnate the STF within the fabric, which increases the STF permeation and removes excess fluid. Once applied, the material incorporated with STF is dried, and an additional layer or layers of a wide range of sealants are applied to lock the STF within the fabric.

These original formulations and the application process, as well as their use in the creation of protective athletic gear, are all expected to increase the distribution of blunt-force trauma over a larger area while decreasing the impact of torsional effects (twisting) on the joints, both of which provide a beneficial resistance to the stress and strain relative to athletic activities.

DETAILED DESCRIPTION

Figure 1:
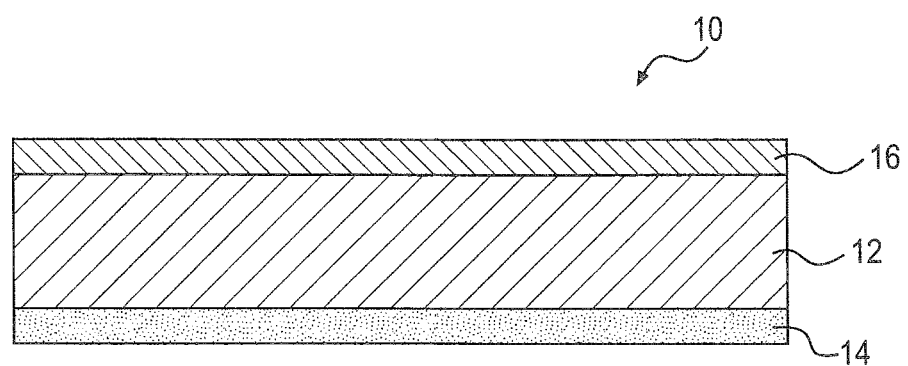
FIG. 1 is a schematic, cross-sectional view of an athletic tape in accordance with an example of the invention.

Formulations of STF have a general composition of colloidal particles and carrier or suspension fluid, varying in 1) the size and type of particles, 2) the suspension solution properties, and 3) the broad spectrum of mixtures and combinations of particles and fluids. These STF solutions are applied to foams or materials, whether pre-woven yarn or already woven or knitted fabric, and are used to protect individuals from injury.

The particles may be silicon-dioxide ($SiO_2$) or oxides incorporating other transition metals (titanium, iron, copper, silver, gold), most often in a colloidal/spherical form, although not excluding other uniform geometric shapes (elliptical, cubical, cuboidal, or other polyhedral forms). Modifications of these oxides can be accomplished on the surface of the molecule through, for example, silanization, varieties of which are well known in the field and are commercially available. Additional non-oxide particles include, but are not limited to, polymers (e.g. borate-based (from the naturally occurring mineral, sassolite), polystyrene, etc.), calcium carbonate mixtures, and/or even softer particles like polymethyl methacrylate. The particles range in size from 10 nm to more than 800 nm, usually less than 1 µm, and can be dispersed in solution as slurry and maintained individually or as a mixture of particles for many months with daily agitation/mixing.

Solutions of STF require, but are not limited to, solvent suspensions of one or more of the following: 1) suspension solution of organic polymers with varying molecular weights (e.g. polyethylene glycol (PEG), polypropylene glycol (PPG), or polyethylene oxide (PEO)), 2) aqueous mixtures (water or a neutral buffered solution), 3) siloxanes (e.g. polydimethyl siloxane), and/or 4) mixtures of two or more of these components. All solutions within the groups of solvents mentioned are considered inert, non-toxic, neutral, non-carcinogenic, non-irritating, and non-flammable, making them perfectly suitable for application to foams and fabrics designed to touch or come in close contact with or contour human skin as a contour-fitting product. The STF may be comprised of about 20% to 50% by weight of the suspension solution, alternatively about 30% to 45% by weight, or still further alternatively about 35% to 40% by weight. The solid particles may comprise about 30% to 75% by weight of the STF, alternatively, about 35% to 50% by weight. An example of a commonly used STF suspension solution is PEG, which is part of a class of compounds derived from ethylene oxide. The PEG naming is for those compounds below a molecular weight of 20,000 g/mole, while for STF, the less often used PEO is anything above 20,000 g/mole. The molecular weight range of PEG classically used is between 100 and 700 with a low viscosity (20-150 cP). The use of co-solvents to increase the efficiency of solubility and mixing process may also be done, such as water, ethanol, isopropyl alcohol, and various alkane solutions, which are then removed from the final solution by exposure to heat (i.e. boiling) during a drying step.

Particles and suspension media, including solvents and co-solvents, if necessary, are most often mixed in a highly vigorous manner using techniques such as shaking, vortexing, sonication, and/or ultrasonic irradiation. In addition, emulsification of many STF solutions requires the use of co-solvents for effective solubility, and these co-solvents can then be removed from the STF by high heat, as long as the shear thickening characteristics are preserved in the absence of co-solvent.

The materials used for application of STF formulations for protective athletic use include, but are not limited to, cotton, polyester, nylon, rayon, Spandex, synthetic foams, or any fabrics where STF can fill the space within the structure of the fabric/yarn/material. For woven fabric, the thickness ranges from 0.1 mm to 10 mm with an array of thread counts from 100 to over 2000 and can be any combination or blend of porous material (i.e. can be bound by STF) with impermeable substances (e.g. elastic, plastic, etc.). For yarn, the linear mass density (deniers, D) ranges from 1D (e.g. silk) to 30D (e.g. nylon) to more than 300D (e.g. Spandex), and application of STF is followed by the fabric construction process (weaving, stitching, knitting), thereby creating the textile and/or product for use as protective gear.

The protective gear may be in the form of an athletic tape or a protective, contour-fit fabric sleeve. In the case of an athletic tape, the tape will be applied directly to the skin or, perhaps directly around a joint using an under wrap. In any event, the tape will contour with the joint of the user. Similarly, a sleeve is made from an elastic fabric material that will be positioned in a snug fashion to match the contour of the joint being covered by the sleeve. For instance, the sleeve could be a sock, thereby covering the ankle of a user. Alternatively, the sleeve could be a tubular sleeve that fits around a knee, elbow, ankle or wrist of a user. In each case, the sleeve will match the contour of the joint that is being wrapped inside the sleeve. Accordingly, the sleeve must be of a flexible enough material and have enough elastic property to wrap around the joint. In both cases, the athletic tape and the protective sleeve, the user is protected from an external blunt force (for instance, a ball, stick, or helmet), but the joint is further protected from internal forces from an inertial injury where the athlete may be spraining their ankle, extending their wrist, knee or elbow in an extreme fashion. Accordingly, the tape or sleeve can protect against both external forces and the athlete's own internal strains.

The process of applying STF to non-woven, woven or knitted fabric involves coating, brushing, spraying, or immersing the material in the solution to essentially saturate the fabric with an application concentration of about 0.5 g to 4 g/square meter of material. The process of applying STF to yarn used to form a knitted fabric substrate involves coating, brushing, spraying, or immersing the yarn in the solution to essentially saturate the yarn with an application concentration range of about 20 μg to 2000 μg of shear thickening fluid per linear meter of yarn, although sometimes even more STF may be applied. The application concentrations of the fabric and yarn will vary depending on the thickness and density of the fabric and yarn. This is followed by compression (range of 1 to 10 Kg/cm$^2$ of force) through pinch-roller or other compression machinery, which will accomplish at least two objectives: 1) the forceful distribution ("squeezing") of the STF within the material in order to increase the intercalation of the STF throughout the fabric or yarn, and 2) the removal of excess STF solution, followed by recycling of unincorporated STF solutions. This process is followed immediately by drying, either at room temperature or elevated temperatures, ranging from 35 C to 120 C or more, for 5 to 120 minutes, sometimes longer, with temperature and drying time dependent upon the type fabric material used and the type and concentration of solvent and co-solvent used.

For already intercalated fabrics and yarns, keeping the STF properly interspersed within the material will be accomplished by using one or more sealant-type additive layers. This will be important for a variety of reasons, such as 1) protecting both the STF from external elements (water, especially) and the athlete from exposure to the STF itself, even though it is a non-toxic mixture, 2) maintaining the integrity of the STF layer by keeping it solidly and uniformly bound to and within the fabric, 3) preventing or reducing the amount of STF from being washed out after exposure to water, detergents, and emollient solutions, and 4) as a non-stick layer to prevent adhesion to glues and other bonding agents. The sealant can be in the form of, but is not limited to, silicone sprays, foams, or liquids, typically polysiloxane derivatives (e.g. cyclopentasiloxane, decamethylpentacyclosiloxane (D5), etc.) or perfluorobutanesulfonic acid, the active ingredient of 3M's Scotch Guard. Importantly, these non-toxic sealants are capable of filtering through to all parts and both sides of the fabric rather than just coating one side, thereby sealing the STF within the fabric, and are easily and rapidly dried at temperatures ranging from room temperature (~22 C) to body temperature (~37 C). Additional protective layers may include an adhesive side or sides for tape applications. The adhesives may include, but are not limited to, bioadhesives, epoxies, acrylic/acrylate polymers, urethanes, and/or polyester resins, all of which will be non-toxic and non-irritating to human skin.

Additional protection will be provided by inclusion of dyes or pigments or colors on top of the STF that is already distributed within the fabric. The coloring process involves addition of the dyes or pigments at a temperature between 80 C and 120 C, typically at 100 C, which is then fixed or set within the fabric. This coloring step can either be done to fabrics or yarns already treated with STF, resulting in a sealant-type process, or the fabric/yarn first followed by STF treatment (no significant sealant properties), all of which would be prior to weaving.

Pigments can also be added to the STF formulations, using a wide range of chemical compositions including, but not limited to, iron oxides, aluminum lakes, and/or (meth)acrylates, many of which will be included as titanium oxide composites or other transition metals, resins, or powders (organic or inorganic). An example of a pigment for this purpose is Aluminum-based pigments (e.g. Red 40, Yellow 104, Blue 2, and combinations thereof). While many dyes are insoluble in PEG, Aluminum Lake Pigments are readily soluble, do not bleed, and are significantly more vibrant than other pigments or metal-based powders.

Together, the purpose of these pigments/dyes is 2-fold: 1) as a protective sealant layer to maintain the proper intercalation of the STF within the fabric or yarn (i.e. coating the STF-treated fabric with the coloring additives); and 2) to provide an indicator for defining and quantifying the amount of STF retention in a fabric after use and washing (i.e. as part of or within the STF formula).

Turning now to the figures, FIG. 1 illustrates an athletic tape 10 that is comprised of an impregnated cotton fabric 12 and further having an adhesive layer 16 on one side and a sealing layer 14 coated on the opposite side. In this example, the adhesive layer 16 acts as a sealant to one side of the impregnated fabric 12. Another sealant such as silicone is used on the sealant layer 14. Although not illustrated, the tape could be coated/sealed on both sides with an adhesive layer to form a two-sided, double-adhesive tape.

Figure 2:
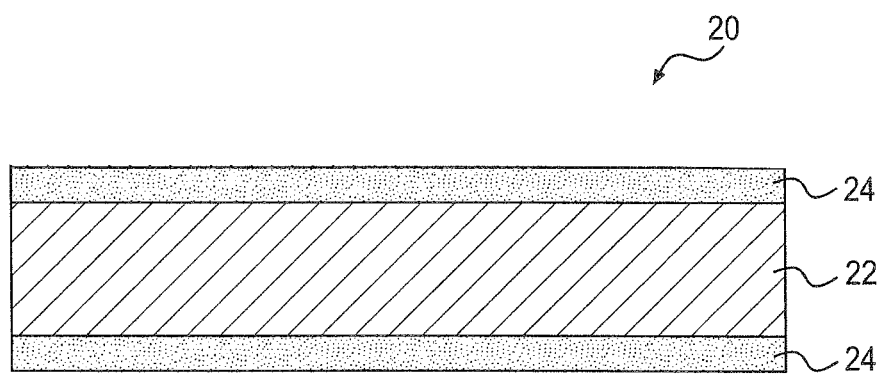
FIG. 2 is a schematic, cross-sectional view of a knitted fabric in accordance with an example of the invention.

FIG. 2 is a double-coated fabric 20. A fabric substrate 22 is impregnated with an STF. On either side of the fabric substrate 22 is a sealing layer 24. The sealing layers act to seal the STF within the fabric substrate 22. The fabric substrate 22 may be a knitted, woven or nonwoven fabric.

EXAMPLES

For athletic tape, there were prepared three STF formulations, shown in Table 1, all of which incorporate PEG 200 (30% volume), water (10% volume), and varying colloidal particle concentrations and sizes. All STF formulas used $SiO_2$ at a particle size of 450 nm, and those with titania used a $TiO_2$ particle size at 250 nm. Analysis of the STF solutions shows a range in viscosity from 300 cPs (centipoises, where 1000 cPs=1 pascale) to more than 7000 cPs, depending on the concentration of $TiO_2$ in the solution.

TABLE 1

Properties of Colloidal Mixtures for Athletic Application

| STF Name | 450 nm $SiO_2$ | 250 nm $TiO_2$ | Avg Particle Size | Viscosity |
|---|---|---|---|---|
| STF 55:5 #1 | 55% wt:vol | 5% wt:vol | 400 ± 200 nm | 1500 ± 500 cPs |
| STF 50:10 #2 | 50% wt:vol | 10% wt:vol | 400 ± 200 nm | 7000 ± 2000 cPs |
| STF 60 #3 | 60% wt:vol | 0% wt:vol | 400 ± 200 nm | 300 ± 100 cPs |

The STF solutions were intercalated into bleached cotton fabric of 200 thread count by immersion at an application rate of 1.4 g of STF per square meter of fabric, followed by drying at 100 C for 30 minutes. The silicone layer was added with a 5 minute drying time at room temperature, and then the adhesive was applied to the fabric. The coated material was cut into sections of 2 inches wide by 10 yards long, rolled onto cardboard spools, and packaged into small cardboard boxes or small resealable bags.

Testing was accomplished using the Micro-Measurement Strain Measurement System 7000 and StrainSmart software (version 4.70) with multiple strain gages (model number C2A-06-250LW-350) patterned onto a semi-solid surface. Table 2 shows the results of empirical testing for stress/strain after impact with a calculated, constant force of 5476 Newtons (variables: height=1.22 m; object mass=45.8 g).

TABLE 2

Empirical Results of Impact Tests for STF Formulations Applied to Athletic Tape

| STF Name | Expected* | Mean | Std. Dev. | Range | Gages Involved[#] |
|---|---|---|---|---|---|
| Untreated | 5476 | 2368 | ±3399 | 174-9654 | 2.25 |
| STF 55:5 #1 | 5476 | 2613 | ±2992 | 179-7787 | 3.75 |
| STF 50:10 #2 | 5476 | 1387 | ±1777 | 267-5370 | 2.25 |
| STF 60 #3 | 5476 | 1508 | ±1778 | 74-4725 | 3.50 |

*Units are in Newtons (Force/Impact of a Falling Object)
[#]Gages involved - the number of gages (out of 8 total) that showed an increase in stress and strain, suggesting a redistribution of force throughout the tape The measurement of strain as a result of drop testing from a height of 1.22 m revealed a substantial decline in the resultant impact for STF50: 10 #2 and STF60 #3 when compared to Untreated tape (~1.6-1.7-fold) and nearly 2-fold less than the STF55: 5 #1. In addition, the changes in the distribution of the force over more sensor-gages for each tape variety, were assessed showing that STF55: 5 #1 and STF60 #3 are capable of redistributing the impact/force over a much wider area of the tape, thereby increasing the number of gages that display increased force.

For the athletics sleeves/socks, the methods for incorporation of STF were accomplished using only the STF60 #3 formulation. The first method was a basic dipping method (Post-treated Socks) where the sock was submersed in STF60 #3 and allowed to dry at 80 C for 60 minutes, and untreated or treated with water socks served as controls. Three independent pairs of socks were used, and within each pair, one sock served as the control and the other as the STF treated sample. Prior to drying, excess STF (or water) was forced out of the socks using pressure rollers, repeating at least two times. After drying, various tests with the socks confirmed the utility of this formulation in the creation of athletic socks for use in youth and higher level sports for preventing both contact and non-contact-related injuries. The initial, very simple informative test was a 'bounce or recoil test', where the 45.8 g object used above was dropped from 0.53 m, and the corresponding recoil height was measured. Shown in Table 3 are the results of these simple tests, providing important confirmation (~30% reduction in bounce) of the fact that STF-treated athletic socks will be useful for player protection and injury prevention.

TABLE 3

Post-treated Sock Recoil Test Results.

| STF Name | Trial #1 | Trial #2 | Trial #3 | Mean |
|---|---|---|---|---|
| Untreated | 13.5 cm | 14.2 cm | 14.8 cm | 14.2 cm |
| STF 60 #3 | 10.1 cm | 11.8 cm | 11.0 cm | 11.0 cm |

*each trial is an average of 3 independent experimental measurements

Using the same test as described for athletic tape, strain testing was accomplished for the Post-treated athletic socks using the Micro-Measurement Strain Measurement System 7000 and StrainSmart software (version 4.70) with multiple strain gages (model number C2A-06-250LW-350) patterned onto a semi-solid surface. Table 4 shows the results of empirical testing for stress/strain after impact with a calculated, constant force of 5476 Newtons (variables: height=1.22 m; object mass=45.8 g).

TABLE 4

Empirical Results of Impact Tests for STF60 #3 Formulation Applied to Socks

| | Strain location | Area 1 | Area 2 | Area 3 | Area 4 | Area 5 | Area 6 | Area 7 | Area 8 | Max | Mean |
|---|---|---|---|---|---|---|---|---|---|---|---|
| | | | Strain Profile at Maximum Impact | | | | | | | Overall Results | |
| Untreated Socks | MeanA* | 2889 | 28020 | 1744 | 2116 | 339 | 729 | 570 | 15286 | 34166 | 14415 |
| | MinA | 1008 | 23327 | 762 | 800 | 168 | 236 | 365 | 858 | | |
| | MaxA | 4957 | 34166 | 3377 | 4466 | 602 | 1380 | 684 | 31521 | | |
| STF60 #3 Socks | MeanA | 4138 | 8277 | 793 | 1043 | 267 | 390 | 794 | 26076 | 32594 | 11155 |
| | MinA | 2725 | 5514 | 700 | 488 | 223 | 239 | 770 | 15349 | | |
| | MaxA | 6695 | 13331 | 888 | 1396 | 300 | 606 | 835 | 32594 | | |

*MeanA - average amplitude, MinA - average of the minimum amplitude, MaxA - average of the maximum amplitude The measurement of strain as a result of drop testing from a height of 1.22 m revealed a substantial decline in the resultant impact for STF60 #3 socks compared to Untreated socks (~34% reduction in strain for the STF60 #3 socks), similar to the reduction observed in the simple drop test (Table 3). Thus, the STF60 treated socks showed a reproducible reduction in the deflection of impact compared to controls, indicating that inclusion of STF in sock/sleeve material will provide resistance to the blunt-force trauma typical of many athletic activities.

The second method for incorporating STF60 #3 into socks was to treat the yarn after color was added to the spool (Pre-treated Socks). The yarn was saturated with color at 100 C using pressure treatment, followed by cooling and drying. The STF60 #3 was subsequently added to the spool of yarn using the same pressure treatment as color addition except at room temperature (22 C). The amount of STF60 #3 used was 10 kg per 30 kg of yarn (1 spool), which is calculated at ~42 μg/linear meter of yarn. Prior to drying, excess SIP was forced out of the socks using pressure rollers, repeating at least 2 times. After drying at 50 C for 20 minutes, the socks were knitted and manufactured for testing. As above, the very simple informative test was a 'bounce or recoil test', where the 45.8 g object used above was dropped from 0.53 m, and the corresponding recoil height was measured. Shown in Table 5 are the results of these simple tests, providing important confirmation (~37% reduction in recoil) that the STF-treated athletic socks, either dipped in STF or pretreated prior to stitching or knitting, will allow for increased player protection and injury prevention for a wide variety of sports.

TABLE 5

Pre-treated Sock Recoil Test Results.

| STF Name | Trial #1* | Trial #2 | Trial #3 | Mean |
|---|---|---|---|---|
| Untreated | 12.6 cm | 12.6 cm | 13.1 cm | 12.8 cm |
| STF 60 #3 | 6.9 cm | 8.2 cm | 9.2 cm | 8.1 cm |

*each trial is an average of 3 independent experimental measurements

While the invention has been described with reference to specific embodiments thereof, it will be understood that numerous variations, modifications and additional embodiments are possible, and all such variations, modifications, and embodiments are to be regarded as being within the spirit and scope of the invention.

What is claimed is:

1. An athletic tape comprising:
an impregnated fabric substrate, an adhesive layer coated onto one side of the fabric substrate, and a sealing layer coated onto the opposite side of the fabric substrate from the adhesive layer;
wherein the fabric substrate is impregnated with a shear thickening fluid, the shear thickening fluid comprising a suspension solution with solid particles suspended therein.

2. An athletic tape as described in claim 1, wherein the fabric substrate is a woven cotton having a thread count of 100 to 400.

3. An athletic tape as described in claim 1, wherein the sealing layer is comprised of silicone.

4. An athletic tape as described in claim 1, wherein the sealing layer is a second adhesive layer, thereby forming a two-sided adhesive tape.

5. An athletic tape as described in claim 1, wherein the suspension solution component of the shear thickening fluid is comprised of polyethylene glycol.

6. An athletic tape as described in claim 5, wherein the polyethylene glycol has a molecular weight of between about 100 and 700.

7. An athletic tape as described in claim 1, wherein the solid particles suspended in the shear thickening fluid are comprised of metal oxides, with the metal selected from the group consisting of silicon, titanium, iron and copper.

8. An athletic tape as described in claim 7, wherein the solid particles are comprised in major part of particles that range in size from about 10 nm to one μm.

9. An athletic tape as described in claim 1, wherein the fabric substrate is impregnated with about 0.5 to 4 g/square meter of shear thickening fluid.

10. An athletic tape as described in claim 1, wherein the shear thickening fluid is comprised of 20% to 50% by weight of the suspension solution and 30% to 75% by weight of the solid particles.

11. A protective athletic sleeve comprising:
an impregnated, elastic, knitted fabric substrate that is coated on both sides of the substrate with a sealing layer;

wherein the knitted fabric substrate is impregnated with a shear thickening fluid, the shear thickening fluid comprising a suspension solution with solid particles suspended therein.

12. The protective athletic sleeve of claim 11, wherein the athletic sleeve is a sock.

13. The protective athletic sleeve of claim 11, wherein the sealing layers are comprised of silicone.

14. The protective athletic sleeve of claim 11, wherein the suspension solution component of the shear thickening fluid is comprised of polyethylene glycol.

15. The protective athletic sleeve of claim 11, wherein yarn used to make the knitted fabric substrate is impregnated with about 20 μg/linear meter to 2000 μg/linear meter of shear thickening fluid.

16. The protective athletic sleeve of claim 11, wherein the shear thickening fluid is comprised of 20% to 50% by weight of the suspension solution and 30% to 75% by weight of the solid particles.

17. The protective athletic sleeve of claim 11, wherein the knitted fabric substrate is comprised of a yarn that is impregnated with a shear thickening fluid prior to the yarn being knitted into the fabric substrate.

18. A method of manufacturing a protective athletic fabric comprising the steps of:
   providing a textile substrate;
   saturating substrate with a shear thickening liquid;
   pressure treating the saturated textile substrate to increase distribution of the liquid in the substrate;
   drying the substrate after the pressure treating step; and
   applying a sealing layer to the substrate after pressure treating and drying the substrate.

* * * * *